(12) United States Patent
Huang

(10) Patent No.: US 11,859,654 B2
(45) Date of Patent: Jan. 2, 2024

(54) CARRYING RACK CONNECTING DEVICE

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 359 days.

(21) Appl. No.: 17/395,151

(22) Filed: Aug. 5, 2021

(65) Prior Publication Data
US 2023/0040516 A1 Feb. 9, 2023

(51) Int. Cl.
*F16B 7/18* (2006.01)

(52) U.S. Cl.
CPC ..................... *F16B 7/187* (2013.01)

(58) Field of Classification Search
CPC .............. F16B 7/187; B60R 9/10; B60R 9/06
USPC .......... 224/555, 519; 280/506, 507; 403/378
See application file for complete search history.

(56) References Cited

U.S. PATENT DOCUMENTS

| | | | |
|---|---|---|---|
| 6,974,147 B1 * | 12/2005 | Kolda | B60R 9/10 280/506 |
| 7,004,491 B1 * | 2/2006 | Allsop | B60D 1/52 280/491.2 |
| 7,044,491 B2 * | 5/2006 | Kettler | B62K 9/00 280/282 |
| 7,338,065 B1 * | 3/2008 | Clausen | B60D 1/241 280/505 |
| 7,448,640 B2 * | 11/2008 | Weaver | B60D 1/06 280/506 |
| 7,600,774 B1 * | 10/2009 | Speer | B60D 1/58 403/387 |
| 7,717,455 B2 * | 5/2010 | Morris | B60D 1/07 280/491.5 |
| 7,802,807 B2 * | 9/2010 | Blakley | B60D 1/52 280/495 |
| 8,141,760 B2 * | 3/2012 | Kuschmeader | B60R 9/06 280/506 |
| 8,308,185 B2 * | 11/2012 | Weaver | B60D 1/025 280/506 |
| 8,596,664 B2 * | 12/2013 | Lahn | B60D 1/241 280/495 |

(Continued)

FOREIGN PATENT DOCUMENTS

TW M473345 U 3/2014

*Primary Examiner* — Nathan J Newhouse
*Assistant Examiner* — Lester L Vanterpool
(74) *Attorney, Agent, or Firm* — MUNCY, GEISSLER, OLDS & LOWE, P.C.

(57) ABSTRACT

A carrying rack connecting device is provided, including a connection rod and a connection assembly. The connection rod is configured to be connected to a mounting rod. The connection assembly has a base, an urging member and an operation member. The base is positioned inside the connection rod. The base has an operation space. The urging member is movably disposed within the operation space. The urging member has a first abutting portion. The operation member is disposed through the operation space and connected with the base. The operation member has a thread portion and an enlarged portion. The thread portion is screwed to the base. The enlarged portion has a second abutting portion. The second abutting portion is configured to push the first abutting portion.

10 Claims, 10 Drawing Sheets

(56) References Cited

U.S. PATENT DOCUMENTS

| | | | | |
|---|---|---|---|---|
| 8,696,011 B2* | 4/2014 | Despres | ............... | B60D 1/52 |
| | | | | 280/495 |
| 8,944,516 B2* | 2/2015 | Eidsmore | ............... | B60P 1/28 |
| | | | | 280/506 |
| 9,242,521 B2* | 1/2016 | Columbia | ............. | B60D 1/52 |
| 9,663,040 B1* | 5/2017 | Shen | ..................... | B60R 9/10 |
| 11,214,203 B2* | 1/2022 | Wang | ..................... | B60R 9/10 |
| 2009/0189369 A1* | 7/2009 | Thomas | ............... | B60D 1/60 |
| | | | | 280/507 |
| 2011/0089669 A1* | 4/2011 | Despres | ............... | B60D 1/52 |
| | | | | 29/525.01 |
| 2014/0084568 A1* | 3/2014 | Lahn | .................. | B60D 1/241 |
| | | | | 280/506 |

* cited by examiner

US 11,859,654 B2

CARRYING RACK CONNECTING DEVICE

BACKGROUND OF THE INVENTION

Field of the Invention

The present invention relates to a carrying rack connecting device.

Description of the Prior Art

There are many types of carrying racks, so the ways they are combined with the vehicle are also different. In the common conventional way (disclosed in TW M473345, for example), a connecting rod of the carrying rack is connected with a mounting rod of the vehicle by insertion, and a connecting member is disposed through and connects the connecting rod and the mounting rod, such as the carrying frame structure.

However, in the conventional carrying rack, the connecting rod and the mounting rod cannot be stably connected because there is a gap between the connecting rod and the mounting rod. During moving of the vehicle, the adjusting member (such as a bolt) is wobbling relative to the connecting rod, resulting in deformation and wear of the adjusting member and resulting in enlargement of the through hole within which the adjusting member is disposed, due to collision of the adjusting member, the connecting rod and the mounting rod. As a result, the connection of the connecting rod and the mounting rod is unstable, the adjusting member can be damaged and is hard to mount/dismount, and/or the adjusting member might detach and causes danger.

The present invention is, therefore, arisen to obviate or at least mitigate the above-mentioned disadvantages.

SUMMARY OF THE INVENTION

The main object of the present invention is to provide a carrying rack connecting device which is easy to assemble and stable.

To achieve the above and other objects, a carrying rack connecting device is provided, including: a connection rod, including a first through hole extending along a first direction and a second through hole extending along a second direction, configured to be connected to a mounting rod in a third direction, the first direction, the second direction and the third direction being perpendicular to one another; and a connection assembly, including a base, an urging member and an operation member, the base being positioned inside the connection rod, the base including an operation space, the operation space being in communication with the first through hole and the second through hole, the urging member being received within the operation space and movable along the first direction to be protrusive beyond the first through hole for urging an inner wall of the mounting rod, the urging member including a first abutting portion, the operation member being configured to be disposed through the mounting rod, extending within the operation space via the second through hole and being connected to the base, the operation member being movable in the second direction by rotating the operation member, the operation member including a threaded portion and an enlarged portion connected with each other, the threaded portion having a diametric dimension smaller than a diametric dimension of the enlarged portion, the threaded portion being screwed to the base, the enlarged portion including a second abutting portion, at least one of the second abutting portion and the first abutting portion extending in a direction tilted to the first direction and the second direction; wherein when the second abutting portion pushes the first abutting portion in the second direction, the first abutting portion slides relatively on the second abutting portion so that the enlarged portion pushes the urging member to protrude out from the first through hole in the first direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
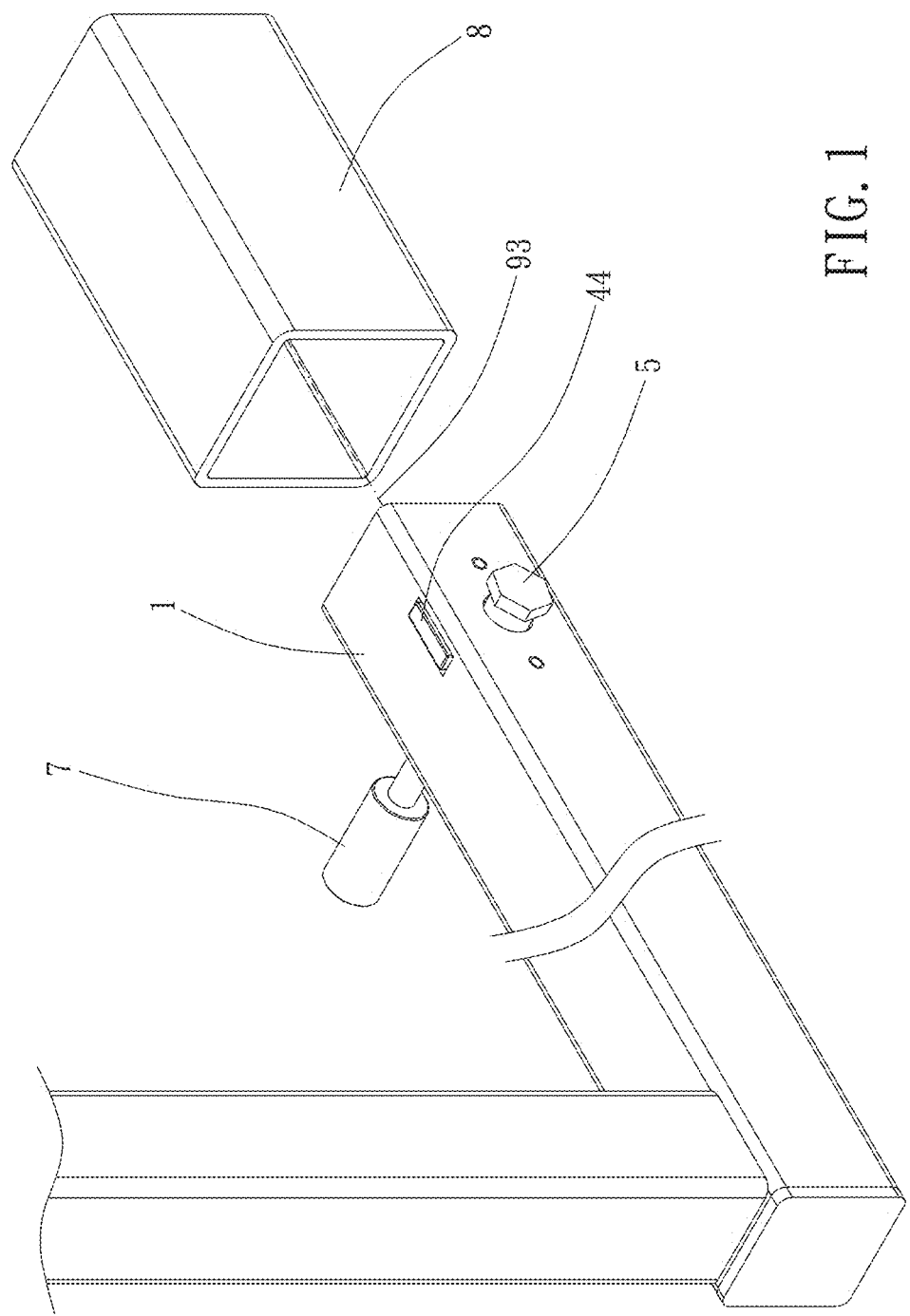
FIG. 1 is a stereogram of a preferable embodiment of the present invention.
Figure 2:
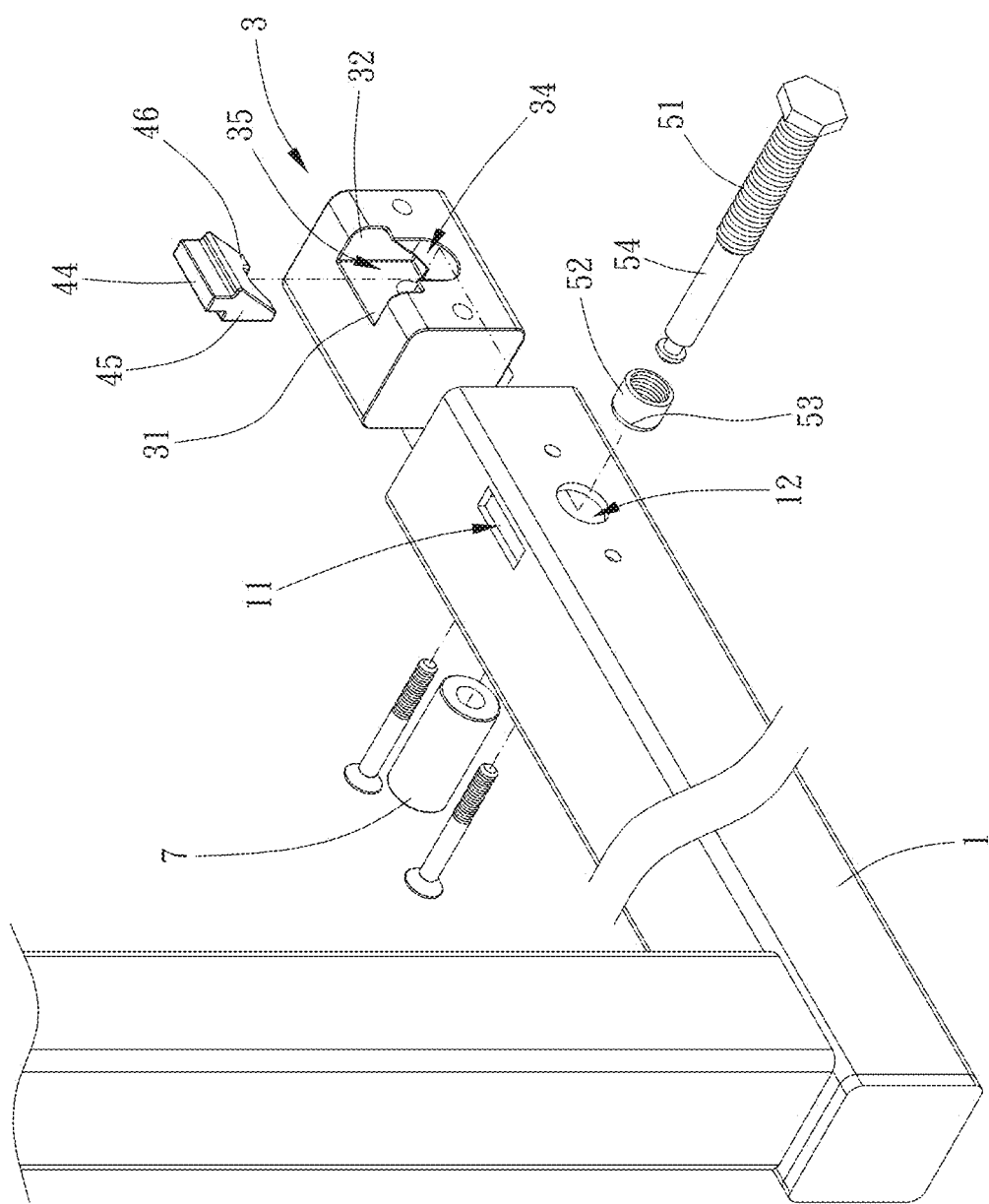
FIG. 2 is a breakdown drawing of FIG. 1.
Figure 3:
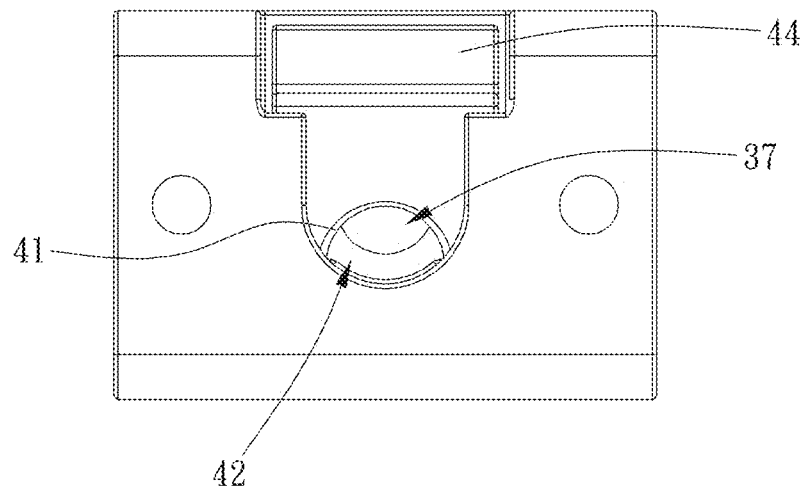
FIG. 3 is a drawing showing of a base and an urging member without pinning of an operation member according to a preferable embodiment of the present invention.
Figure 4:
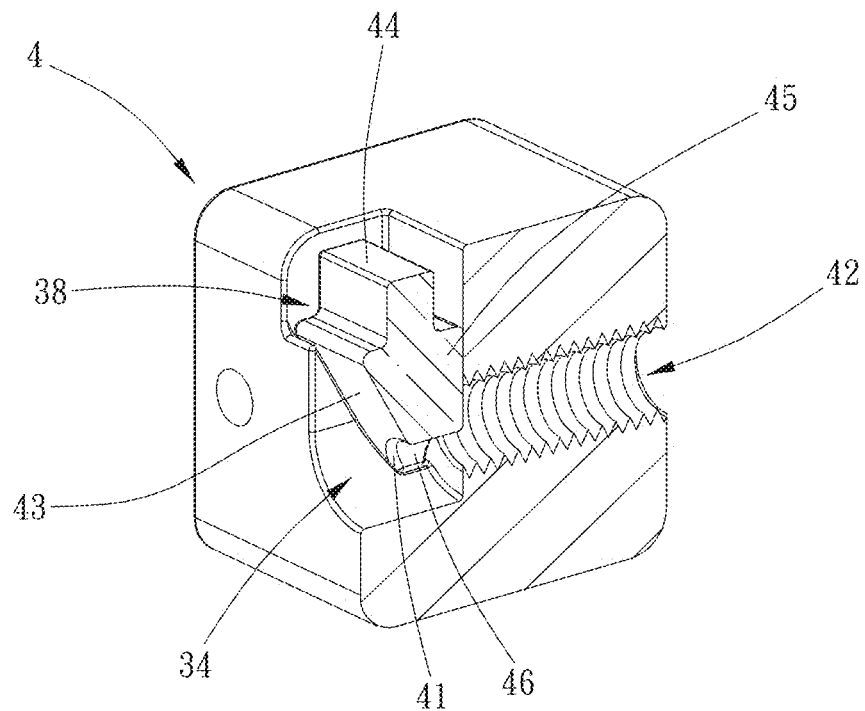
FIG. 4 is a partial cross-sectional perspective view of FIG. 3.
Figure 5:
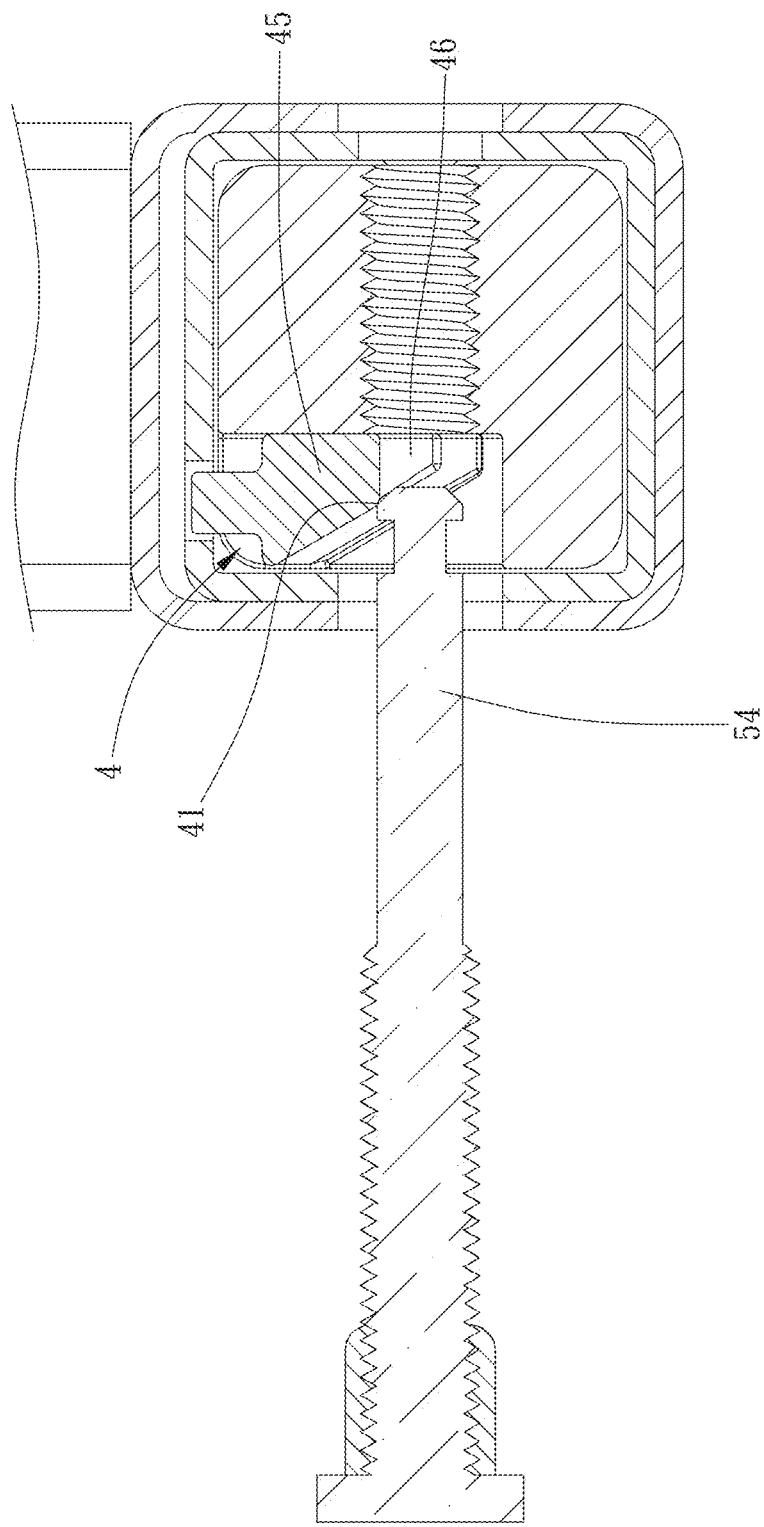
FIGS. 5-8 are drawings showing operation of the operation member of a preferable embodiment of the present invention.
Figure 6:
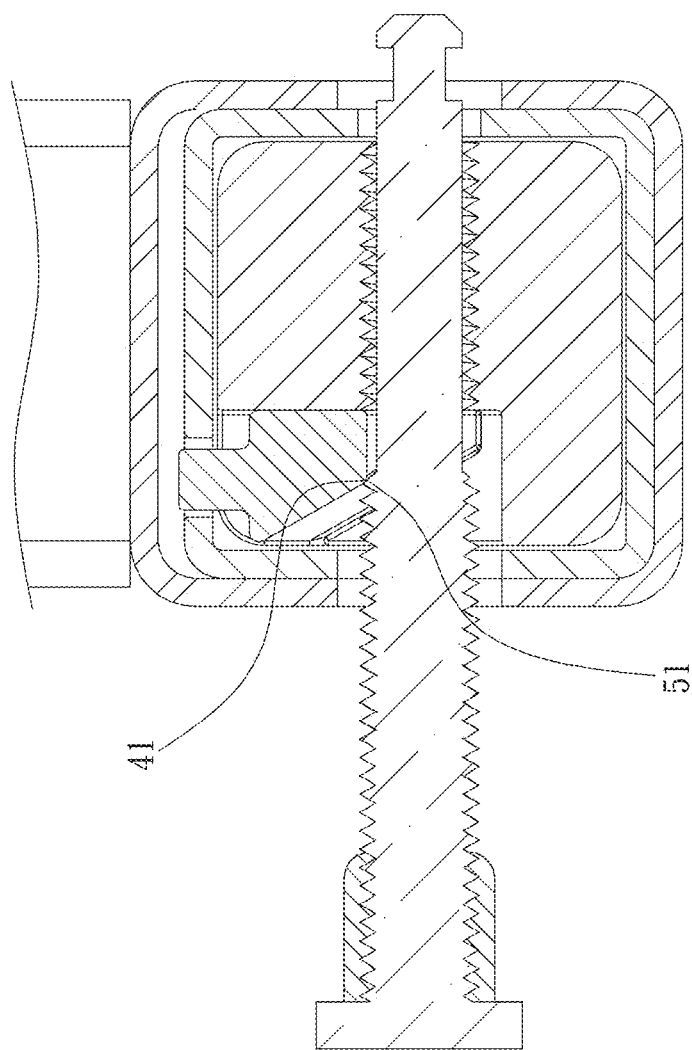
Figure 7:
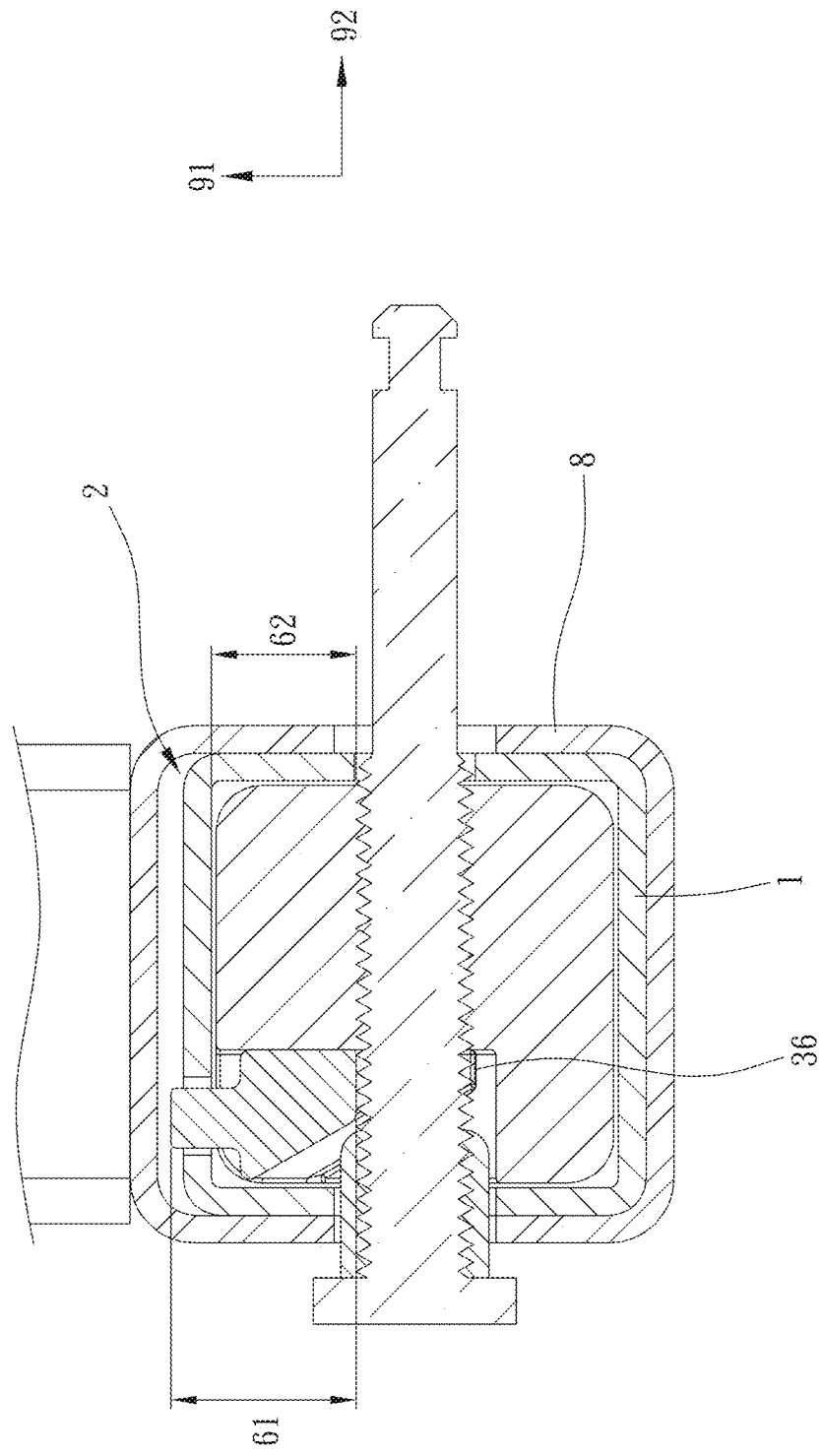
Figure 8:
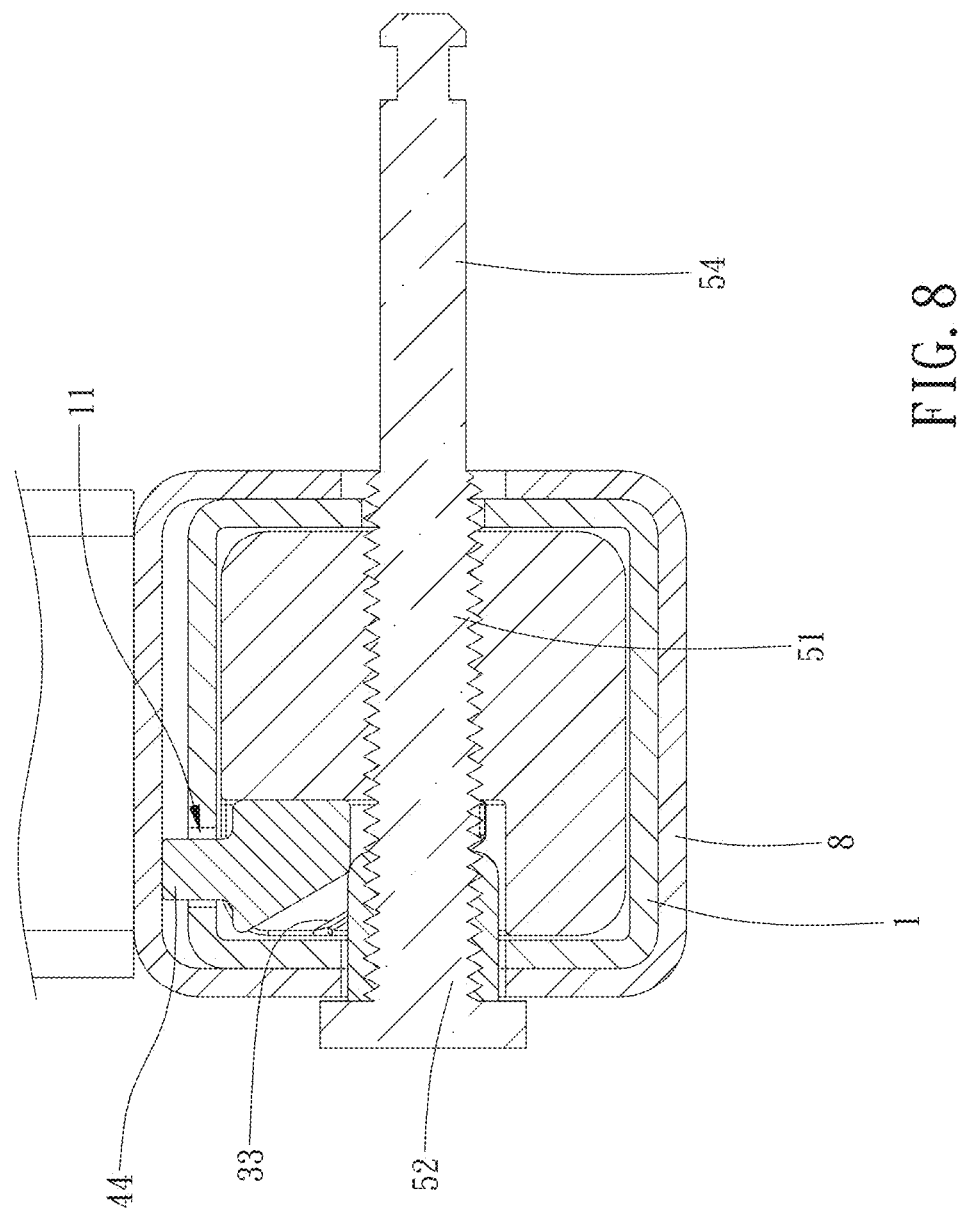
Figure 9:
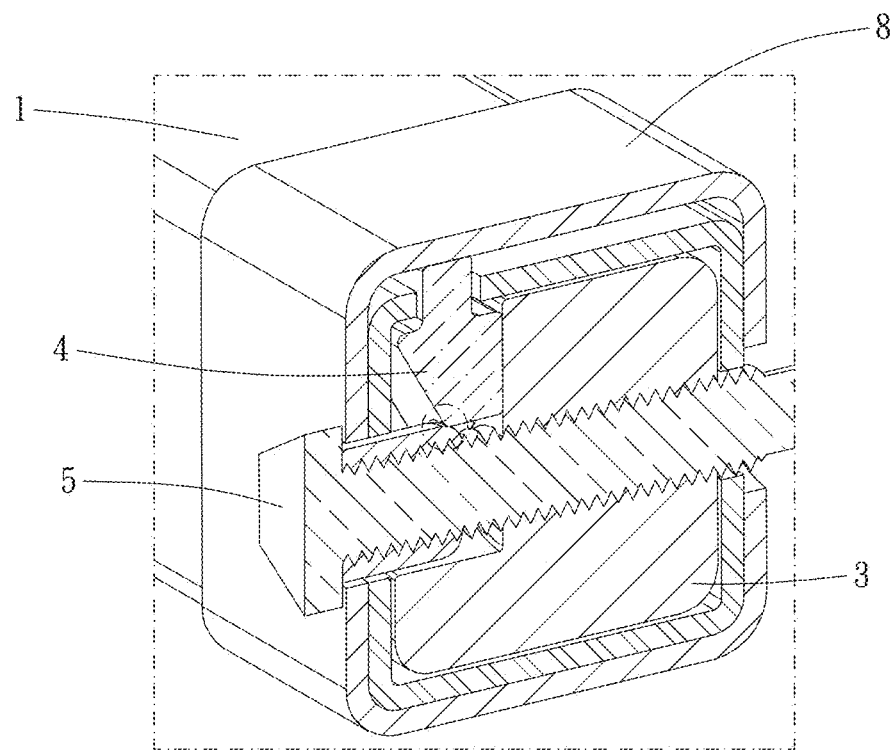
FIG. 9 is a stereogram of FIG. 8.
Figure 10:
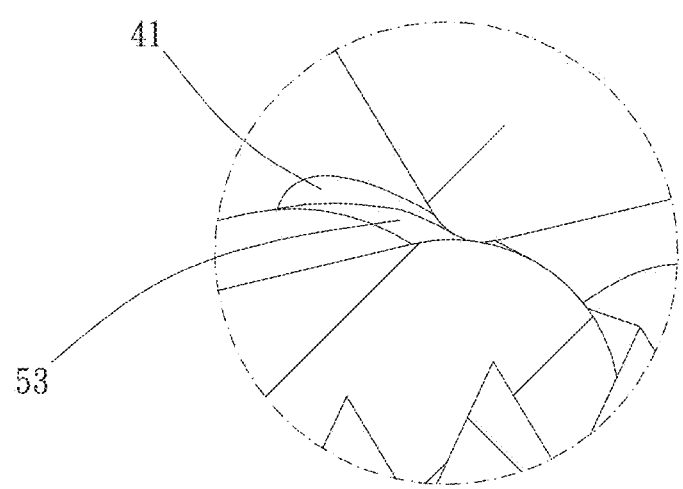
FIG. 10 is a partial enlargement of FIG. 9.

Please refer to FIGS. 1 to 10 for a preferable embodiment of the present invention. A carrying rack connecting device 1 of the present invention includes a connection rod 1 and a connection assembly 2.

The connection rod 1 includes a first through hole 11 extending along a first direction 91 and a second through hole 12 extending along a second direction 92, and the connection rod 1 is configured to be connected to a mounting rod 8 in a third direction 93, wherein the first direction 91, the second direction 92 and the third direction 93 are perpendicular to one another.

The connection assembly 2 includes a base 3, an urging member 4 and an operation member 5, the base 3 is positioned inside the connection rod 1, the base 3 includes an operation space 35, and the operation space 35 is in communication with the first through hole 11 and the second through hole 12. The urging member 4 is received within the operation space 35 and movable along the first direction 91 to be protrusive beyond the first through hole 11 for urging an inner wall of the mounting rod 8, which can eliminates assembling gap between the connection rod 1 and the mounting rod 8, and improves assembling stability of the connection rod 1 and the mounting rod 8.

The urging member 4 includes a first abutting portion 41, the operation member 5 is configured to be disposed through the mounting rod 8, extends within the operation space 35 via the second through hole 12 and is connected to the base 3. Specifically, the operation member 5 is movable in the second direction 92 by rotating the operation member 5. The operation member 5 includes a threaded portion 51 and an enlarged portion 52 connected with each other, the threaded portion 51 has a diametric dimension smaller than a diametric dimension of the enlarged portion 52, the threaded portion 51 is screwed to the base, and the enlarged portion 52 includes a second abutting portion 53. At least one of the second abutting portion 53 and the first abutting portion 41 extends in a direction tilted to the first direction 91 and the second direction 92 so that when the second abutting portion 53 pushes the first abutting portion 41 in the second direction 92, the first abutting portion 41 slides relatively on the second abutting portion 53 so that the enlarged portion 52 pushes the urging member 4 to protrude out from the first through hole 11 in the first direction 91.

Specifically, the threaded portion 51 has a length larger than a length of the enlarged portion 52, and the enlarged portion 52 is cylindrical. The first abutting portion 41 and the second abutting portion 53 extend inclinedly relative to the first direction 91 and the second direction 92, thus providing smooth movement. The enlarged portion 52 is screwed to and disposed around the threaded portion 51, and the threaded portion 51 is protrusive out beyond the enlarged portion 52 and screwed to the base 3.

In this embodiment, the enlarged portion 52 is detachably connected with the threaded portion 51. The second abutting portion 53 has rigidity smaller than rigidity of the first abutting portion 41 so that the first abutting portion 41 is not easy to be worn and there just is a need to replace the enlarged portion 52. The urging member 4 includes a channel 42 disposed therethrough, the operation member 5 is disposed through the channel 42 and connected to the base 3, the first abutting portion 41 extends arcuately at a periphery of the channel 42, and the second abutting portion 53 extends arcuately at the distal end of the enlarged portion 52.

Preferably, the operation member 5 further includes an extension portion 54, the extension portion 54 is connected with the threaded portion 51 and configured to be connected with and protrusive out the mounting rod 8, and the extension portion 54 is configured to be connected with a fastener 7. The fastener 7 can stably secure the operation member 5, the mounting rod 8 and the connection rod 1.

In this embodiment, the extension portion 54 has a diametric dimension smaller than a diametric dimension of the threaded portion 51, a distal end of the extension portion 54 is arcuate, the first abutting portion 41 faces toward the second through hole 12, and the base 3 further includes a threaded hole 37 within which the threaded portion 51 is screwed. When the operation member 5 is not within the operation space 35, the urging member is abutted against a bottom wall 36 of the operation space 35 in the first direction 91 and is not protrusive beyond the base 3 so that the first abutting portion 41 and the threaded hole 37 overlap in the second direction 92.

During insertion of the operation member 5, the distal end of the extension portion 54 pushes the first abutting portion 41 to move the urging member, the urging member is disengaged from the bottom wall 36 and slidably abutted against the extension portion 54 (first stage); when the operation member 5 moves in a direction through the base 3, the threaded portion 51 pushes the first abutting portion 41 to further move the urging member (second stage), the urging member is slidably abutted against the threaded portion 51; when the operation member 5 keeps moving in the direction through the base 3, the second abutting portion 53 pushes the first abutting portion 41 to further move the urging member (third stage) so that the urging member is urgingly abutted against the inner wall of the mounting rod 8. In other words, during insertion of the operation member 5, the urging member is pushed by three-stage pushing of the urging member through so that the urging member can move stably and smoothly in the first direction 91.

Specifically, the base 3 further includes a first inner side wall 31 perpendicular to the second direction 92 and two second inner side walls 32 perpendicular to the second direction 92. The two second inner side walls 32 are separately arranged and laterally connected with the first inner side wall 31 to define the operation space 35, and the urging member 4 is kept slidably abutted against the first inner side wall 31 and the two second inner side walls 32. The first inner side wall 31 and the two second inner side walls 32 can effectively restrict, limit and guide the urging member 4 to move along the first direction 91.

Specifically, the base 3 further includes a third inner side wall 33 and a perforation 34, the third inner side wall 33 corresponds to the first inner side wall 31 and is connected with the two second inner side walls 32, and the third inner side wall 33 inclinedly extends relative to the second direction 92. The first inner side wall 31, the two second inner side walls 32 and the third inner side wall 33 define the operation space 35, the perforation 34 is disposed through the third inner side wall 33 in the second direction 92, and the perforation 34 is in communication with the operation space 35 and the second through hole 12. The urging member 4 further includes an inclined wall 43. When the operation member 5 is not within the operation space 35, the inclined wall 43 is abutted against the third inner side wall 33.

The inclined wall 43 and the third inner side wall 33 increase contact area therebetween. As the operation member 5 is not within the base 3 and the connection rod 1, the urging member 4 can be stably supported and guided. The difference between the first inner side wall 31 and the third inner side wall 33 provides definite indication for assembling.

In this embodiment, in the first direction 91, the first inner side wall 31 and the two second inner side walls 32 is of the same height, and the third inner side wall 33 is lower than the first inner side wall 31 so as to form an opening 38. When the inclined wall 43 is abutted against the third inner side wall 33, the urging member 4 is partially exposed from the opening 38, which is easy to grip the urging member 4 from the opening 38.

When the operation member 5 is within the operation space 35 and connected to the base 3 and the second abutting portion 53 does not push the first abutting portion 41, the urging member 4 is abutted against a portion of the threaded portion 51 located within the operation space 35. The urging member 4 further includes a projection 44, and the projection 44 is located at a side of the urging member 4 opposite to the operation member 5. When the urging member 4 is abutted against the threaded portion 51, in the first direction 91, a distance between an end of the projection 44 opposite to the operation member 5 and the threaded portion 51 is defined as a first distance 61, a distance between the first through hole 11 and the threaded portion 51 is defined as a second distance 62, the first distance 61 is greater than the second distance 62, and the projection 44 is inserted within the first through hole 11 to enforce support to the urging member 4.

Specifically, the urging member 4 further includes a main body 45 and two leg portions 46, the projection 44 and the two leg portions 46 are disposed at two opposing sides of the main body 45, the inclined wall 43 extends from a side of the main body 45 to a side of the two leg portions 46, the two leg portions 46 are arranged in interval and form the channel 42 with the main body 45, the channel 42 is an open structure, and the operation member 5 is disposed between the two leg portions 46.

Figure 11:
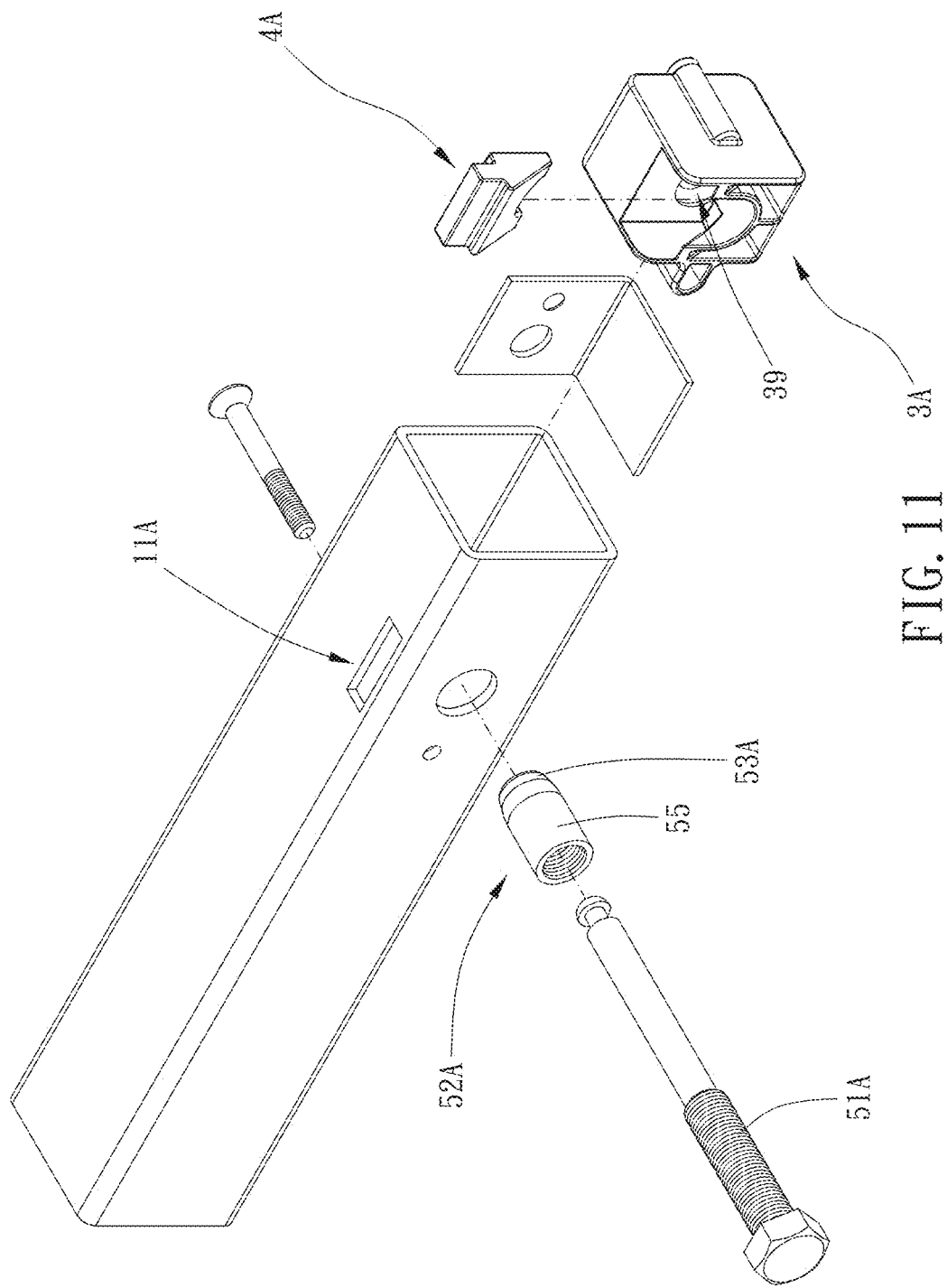
FIG. 11 is a breakdown drawing of another preferable embodiment of the present invention.
Figure 12:
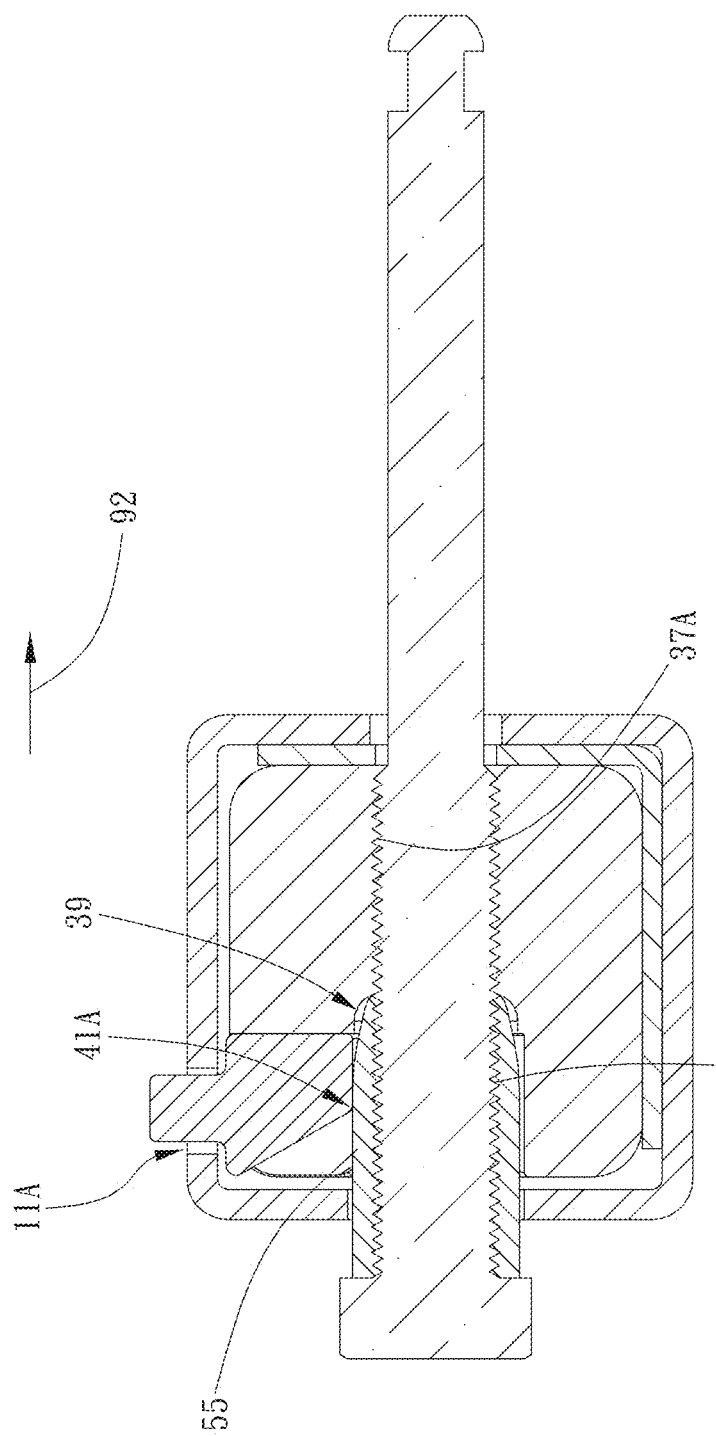
FIG. 12 is a cross-sectional view of the another preferable embodiment of the present invention.

In an embodiment shown in FIGS. 11 and 12, the base 3A further includes a threaded hole 37A within which the threaded portion 51A is screwed, and a recess 39. The recess 39 is recessed in the second direction 92 and in communication with the threaded hole 37A, and the second abutting portion 53A is inclined. The enlarged portion 52A further includes a third abutting portion 55, and the third abutting portion 55 extends along the second direction 92 and is connected with a topmost portion of the second abutting portion 53A. When first abutting portion 41A slides from the second abutting portion 53A to the third abutting portion 55 and protrudes out beyond first through hole 11A, the second abutting portion 53A is inserted within the recess 39. It is noted that the third abutting portion 55 is preferably thick and has good structural strength so as to effectively and reliably urge urging member 4A. The second abutting portion 53A is partially engaged within the recess 39, which improves stability of assembling of the base 3A.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A carrying rack connecting device, including:
   a connection rod, including a first through hole extending along a first direction and a second through hole extending along a second direction, configured to be connected to a mounting rod in a third direction, the first direction, the second direction and the third direction being perpendicular to one another; and
   a connection assembly, including a base, an urging member and an operation member, the base being positioned inside the connection rod, the base including an operation space, the operation space being in communication with the first through hole and the second through hole, the urging member being received within the operation space and movable along the first direction to be protrusive beyond the first through hole for urging an inner wall of the mounting rod, the urging member including a first abutting portion, the operation member being configured to be disposed through the mounting rod, extending within the operation space via the second through hole and being connected to the base, the operation member being movable in the second direction by rotating the operation member, the operation member including a threaded portion and an enlarged portion connected with each other, the threaded portion having a diametric dimension smaller than a diametric dimension of the enlarged portion, the threaded portion being screwed to the base, the enlarged portion including a second abutting portion, at least one of the second abutting portion and the first abutting portion extending in a direction tilted to the first direction and the second direction;
   wherein when the second abutting portion pushes the first abutting portion in the second direction, the first abutting portion slides relatively on the second abutting portion so that the enlarged portion pushes the urging member to protrude out from the first through hole in the first direction.

2. The carrying rack connecting device of claim 1, wherein the enlarged portion is screwed to and disposed around the threaded portion, and the threaded portion is protrusive out beyond the enlarged portion and screwed to the base.

3. The carrying rack connecting device of claim 1, wherein the base further includes a threaded hole within which the threaded portion is screwed, and a recess, the recess is recessed in the second direction and in communication with the threaded hole, the second abutting portion is inclined, the enlarged portion further includes a third abutting portion, the third abutting portion extends along the second direction and is connected with a topmost portion of the second abutting portion; when the first abutting portion slides from the second abutting portion to the third abutting portion and protrudes out beyond the first through hole, the second abutting portion is inserted within the recess.

4. The carrying rack connecting device of claim 1, wherein the first abutting portion and the second abutting portion extend inclinedly relative to the first direction and the second direction, the urging member includes a channel disposed therethrough, the operation member is disposed through the channel and connected to the base, the first abutting portion extends arcuately at a periphery of the channel, and the second abutting portion extends arcuately at a distal end of the enlarged portion.

5. The carrying rack connecting device of claim 1, wherein when the operation member is within the operation space and connected to the base and the second abutting portion does not push the first abutting portion, the urging member is abutted against a portion of the threaded portion located within the operation space, the urging member further includes a projection, the projection is located at a side of the urging member opposite to the operation member, when the urging member is abutted against the threaded portion, in the first direction, a distance between an end of the projection opposite to the operation member and the threaded portion is defined as a first distance, a distance between the first through hole and the threaded portion is defined as a second distance, the first distance is greater than the second distance, and the projection is inserted within the first through hole.

6. The carrying rack connecting device of claim 5, wherein the urging member further includes a main body and two leg portions, the projection and the two leg portions are disposed at two opposing sides of the main body, the inclined wall extends from a side of the main body to a side of the two leg portions, the two leg portions are arranged in interval, and the operation member is disposed between the two leg portions.

7. The carrying rack connecting device of claim 1, wherein the base further includes a first inner side wall perpendicular to the second direction and two second inner side walls perpendicular to the second direction, the two second inner side walls are separately arranged and laterally connected with the first inner side wall to define the operation space, and the urging member is kept slidably abutted against the first inner side wall and the two second inner side walls.

8. The carrying rack connecting device of claim 7, wherein the base further includes a third inner side wall and a perforation, the third inner side wall corresponds to the first inner side wall and is connected with the two second inner side walls, the third inner side wall inclinedly extends relative to the second direction, the first inner side wall, the two second inner side walls and the third inner side wall define the operation space, the perforation is disposed through the third inner side wall in the second direction, and the perforation is in communication with the operation space and the second through hole; the urging member further includes an inclined wall, and when the operation member is not within the operation space, the inclined wall is abutted against the third inner side wall.

9. The carrying rack connecting device of claim 8, wherein in the first direction, the first inner side wall and the two second inner side walls is of the same height, the third inner side wall is lower than the first inner side wall so as to form an opening, and when the inclined wall is abutted against the third inner side wall, the urging member is partially exposed from the opening.

10. The carrying rack connecting device of claim 6, wherein the enlarged portion is screwed to and disposed around the threaded portion, and the threaded portion is protrusive out beyond the enlarged portion and screwed to the base; the second abutting portion has rigidity smaller than rigidity of the first abutting portion; the first abutting portion and the second abutting portion extend inclinedly relative to the first direction and the second direction, the urging member includes a channel disposed therethrough, the operation member is disposed through the channel and connected to the base, the first abutting portion extends arcuately at a periphery of the channel, and the second abutting portion extends arcuately at the distal end of the enlarged portion; the base further includes a first inner side wall perpendicular to the second direction and two second inner side walls perpendicular to the second direction, the two second inner side walls are separately arranged and laterally connected with the first inner side wall to define the operation space, and the urging member is kept slidably abutted against the first inner side wall and the two second inner side walls; the base further includes a third inner side wall and a perforation, the third inner side wall corresponds to the first inner side wall and is connected with the two second inner side walls, the third inner side wall inclinedly extends relative to the second direction, the first inner side wall, the two second inner side walls and the third inner side wall define the operation space, the perforation is disposed through the third inner side wall in the second direction, and the perforation is in communication with the operation space and the second through hole; the urging member further includes an inclined wall; in the first direction, the first inner side wall and the two second inner side walls is of the same height, the third inner side wall is lower than the first inner side wall so as to form an opening, and when the inclined wall is abutted against the third inner side wall, the urging member is partially exposed from the opening; the threaded portion has a length larger than a length of the enlarged portion; the enlarged portion is cylindrical; the channel is an open structure; the enlarged portion is detachably connected with the threaded portion; the operation member further includes an extension portion, the extension portion is connected with the threaded portion and configured to be connected with and protrusive out the mounting rod, the extension portion is configured to be connected with a fastener; the extension portion has a diametric dimension smaller than a diametric dimension of the threaded portion, a distal end of the extension portion is arcuate, the first abutting portion faces toward the second through hole, the base further includes a threaded hole within which the threaded portion is screwed, when the operation member is not within the operation space, the urging member is abutted against a bottom wall of the operation space in the first direction and is not protrusive beyond the base so that the first abutting portion and the threaded hole overlap in the second direction; during insertion of the operation member, the distal end of the extension portion pushes the first abutting portion to move the urging member, the urging member is disengaged from the bottom wall and slidably abutted against the extension portion, the operation member moves in a direction through the base, the threaded portion pushes the first abutting portion to further move the urging member, the urging member is slidably abutted against the threaded portion, the operation member keeps moving in the direction through the base, and the second abutting portion pushes the first abutting portion to further move the urging member.

* * * * *